United States Patent [19]
Apsit et al.

[11] 3,851,199
[45] Nov. 26, 1974

[54] INDUCTOR GENERATOR

[76] Inventors: Voldemar Voldemarovich Apsit,
ulitsa V. Latsisa, 2a, kv. 21; **Mikhail
Ivanovich Schukin,** ulitsa ieriko, 45,
kv. 41; **Vladislav Alexandrovich
Pugachev,** ulitsa Moskovskaya, 266,
korpus 5, kv. 73; **Valery
Dementievich Yablunovsky,** ulitsa
Reznas, 7, kv. 13, all of Riga;
**Grigory Grigorievich
Alexandrovsky,** ulitsa Tobolskaya,
47, kv. 53, Kharkov; **Jury Ivanovich
Zimichev,** Moskovsky prospekt,
202, kv. 63, Kharkov; **Ivan
Arkhipovich Borovik,** Maskovsky
prospekt, 89, kv. 7, Kharkov, all of
U.S.S.R.

[22] Filed: Dec. 26, 1973

[21] Appl. No.: 428,902

[52] U.S. Cl. ............................................... 310/168
[51] Int. Cl. ............................................ H02k 19/20
[58] Field of Search ........................... 310/168–170,
310/198–208, 112–126

[56] References Cited
UNITED STATES PATENTS

| | | | |
|---|---|---|---|
| 1,642,041 | 9/1927 | Nyman | 310/169 |
| 2,253,966 | 8/1941 | Baumann | 310/169 |
| 3,041,486 | 6/1962 | Moffitt | 310/168 |
| 3,493,800 | 2/1970 | Barrett | 310/168 |
| 3,714,480 | 1/1973 | Apsit et al. | 310/170 |
| 3,767,950 | 10/1973 | Ainvarg | 310/168 |

Primary Examiner—Donovan F. Duggan
Attorney, Agent, or Firm—Waters, Roditi, Schwartz & Nissen

[57] ABSTRACT

Disclosure is made of an inductor machine comprising a stator with a polyphase armature winding arranged on its teeth with a tooth pitch close, but not equal, to $\pi$ electrical degrees; the stator envelops a windingless toothed rotor, whereas a ring field winding produces a common magnetic flux enveloping the stator and the windingless toothed rotor; each phase of said armature winding consists of at least three series-connected and symmetrically arranged branches with a displacement therebetween in electrical degrees being multiple to $2\pi$, each branch consisting of coils arranged upon adjacent teeth of the stator, the number of said teeth being different from the doubled number of the teeth of the windingless toothed rotor by a value equal to the doubled number of the branches.

1 Claim, 4 Drawing Figures

INDUCTOR GENERATOR

The present invention relates to manufacture of electrical machinery and more particularly, to inductor machines; the invention also partains to improvements in acyclic high-frequency inductor generators.

Inductor machines are extensively used as high-frequency power sources in electrothermics, in power supply systems for transport, in automation and control systems, etc.

The known acyclic inductor machines display optimum characteristics with regard to their weight and dimensions when they are single-phase and have the classic toothed arrangement with two tooth intervals of the stator per one tooth interval of the rotor.

Also known at present are three-phase inductor machines, wherein the number of the stator teeth is sufficiently close, but not equal, to the doubled number of the teeth of the rotor, which means that the tooth pitch of the stator is close, but not equal, to $\pi$ electrical degrees.

In this case, the stator winding is made along the lines of the classic single-phase tooth winding, each phase of the stator winding being arranged upon adjacent teeth over one-third of the stator.

Inductor machines are known, too, wherein each phase consists of two coil groups displaced magnetically by 180 electrical degrees and centred around the teeth of the stator, said teeth covering one-sixth of the stator bore.

In the latter case, two groups in the phases of the stator winding are connected in series aiding, which makes it possible to avoid the effects of the rotor's eccentricity upon the values of phase voltages.

Compared to the multiphase inductor machines with the classic toothed arrangement, the multiphase inductor machines with the tooth pitch of the stator close, but not equal, to $\pi$ electrical degrees have a number of advantages.

Thus, these machines have a comparatively small number of stator teeth (the number of the latter being reduced by approximately one-third). A slight shortening or elongation of the coil pitch and a specific arrangement of the coils in the branches account for a good phase voltage waveform. In addition, such inductor machines are marked by a decrease in the longitudinal magnetic flux fluctuation, which is especially important from the viewpoint of the appearance of bearing currents. Of great importance is also the fact that the characteristics of these machines with regard to their weight and dimensions are not inferior to those of the multiphase machines with the classic toothed arrangement.

Yet with all these advantages the machines in question have a number of drawbacks. The circumference of the stator is divided into three zones disposed concentrically wherein are each of the three phases of the three-phase winding; for that reason, the vibration and the play of the rotor, that are due both to the peculiarities of the manufacture thereof and to the specific operating conditions of the inductor machine, exert a substantial influence upon the symmetry and shape of phase voltages.

The above disadvantages limit the sphere of application of this type of inductor machines.

For example, in view of technical requirements imposed upon high-frequency speed transducers of turbogenerators, it is precisely the foregoing advantages that seen to make the inductor machine with the tooth pitch close to $\pi$ electrical degrees most likely to be selected for the purpose. Yet the use of these machines in the role of a high-frequency speed transducer of a turbogenerator, when said transducer has to be attached directly to the shaft of the turbine, is practically impossible, as the vibration of the turbine shaft alone may make the relative change in the air gap in the sliding bearings as high as 30 percent. That, in turn, results in modulations in the electromotive force, as well as in distortions in the shape and repetition of the transducer pulses during one revolution of the shaft. These factors impede operation of the electronic automatic adjustment system.

It is an object of the present invention to eliminate the above disadvantages.

The invention aims at providing an inducator machine with a special arrangement of each armature winding and a specially selected number of stator teeth, which will improve the machine's characteristics with regard to the weight and dimensions thereof and rule out the effects of the vibration and play of the rotor upon the armature winding voltage.

This object is attained by providing an inductor machine with a multiphase armature winding arranged on the stator teeth and having a constant tooth pitch close, but not equal, to $\pi$ electrical degrees, with a windingless toothed rotor and a ring field winding producing a magnetic flux in the stator and in the windingless toothed rotor, wherein each phase of the armature winding consists, in accordance with the invention, of at least three series-connected and symmetrically arranged branches with a displacement therebetween in electrical degrees being multiple to $2\pi$, each branch consisting of coild arranged upon adjacent teeth of the stator, the number of said teeth being different from the doubled number of the teeth of the windingless toothed rotor by a value equal to the doubled number of the branches.

The proposed inductor machine rules out the effects of the vibration and play of the rotor upon the symmetry and waveforms of phase voltages due to the symmetric arrangement of the branches of each phase around the stator bore and the identical conditions in which said branches are found with regard to the electric and magnetic fields (the angle between the branches being multiple to $2\pi$ electrical degrees).

The branches of each phase being connected in series, the electromotive force of the fundamental frequency due to the rotation of the rotor is equal to the sum of the electromotive forces of individual branches of each phase, whereas the additional electromotive forces due to the vibration and play of the rotor are mutually compensated.

The proposed design of an inductor machine reduces the upper harmonic oscillations of the electromotive force due to a shortening or an elongation of the coil pitch and a specific distribution of the coils in the branches; it also substantially reduces flux fluctuations in the external magnetic circuit of the inductor machine.

Compared to the commonly known inductor machines with the classic toothed arrangement, in the proposed machine the number of the stator teeth has been substantially reduced, which, keeping in mind the even distribution thereof around the stator bore, makes for a simple and technologically rational manufacture of a stator pack with a multiphase winding.

The present invention will hereinafter be explained in greater detail with reference to the accompanying drawings, wherein.

Figure 1:
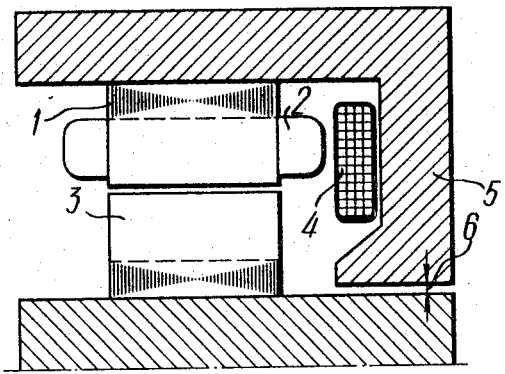
FIG. 1 is a longitudinal section view of a single-pack inductor machine.

Referring now to FIG. 1, arranged upon the teeth of the laminated pack of a stator 1 of the proposed inductor machine, said teeth having a constant tooth pitch, are coils 2 of the multiphase armature winding. Inside the pack of the stator 1, there is a windingless toothed rotor 3 whose teeth are poles of the same polarity.

A ring field winding 4 is arranged upon a stationary magnetic circuit 5 of the inductor machine, which is separated from the windingless toothed rotor 3 by an additional air gap 6.

Figure 2:
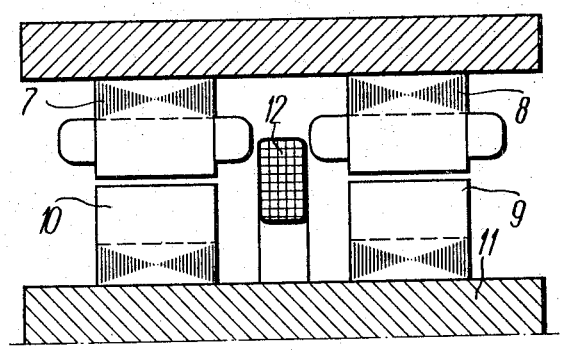
FIG. 2 is a longitudinal section view of a double-pack inductor machine.

The proposed inductor machine may also be made as a double-pack acyclic inductor machine, wherein there are two stator packs 7 and 8 (FIG. 2) and two rotating toothed packs 9 and 10 of the windingless toothed rotor, the latter packs being mounted upon a common cylindrical magnetic circuit 11. In this case a ring field winding 12 is arranged in the space between the stator packs 7 and 8 and the rotating toothed rotor packs 9 and 10.

Figure 3:
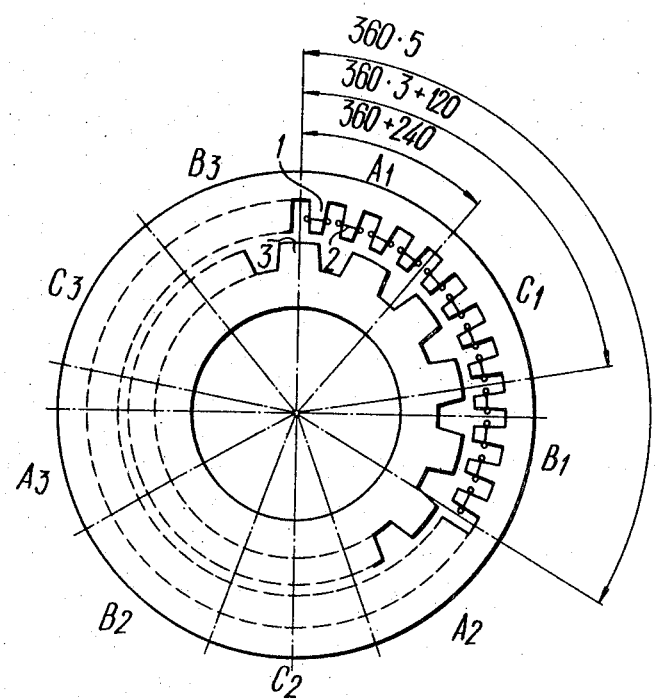
FIG. 3 is a cross-section view of the inductor machine.

FIG. 3 shows one of preferable arrangements of the branches consisting of the coils 2 around the bore of the stator 1 in the single-pack inductor machine with a number $z_3$ of the teeth of the stator 1, $z_s = 36$, and with a number $z_r$ of the teeth of the rotor 3, $z_r = 15$. $k$ is the number of branches in each phase; $k = 3$.

As is seen from FIG. 3, the phase A of the armature winding consists of three branches, $A_1$, $A_2$ and $A_3$. The phase B consists of branches $B_1$, $B_2$ and $B_3$. The phase C consists of branches $C_1$, $C_2$ and $C_3$. Each branch consists of the four coils 2 arranged upon adjacent teeth of the stator 1, which means that the coils 2 of each phase are arranged upon twelve teeth of the stator 1.

Figure 4:
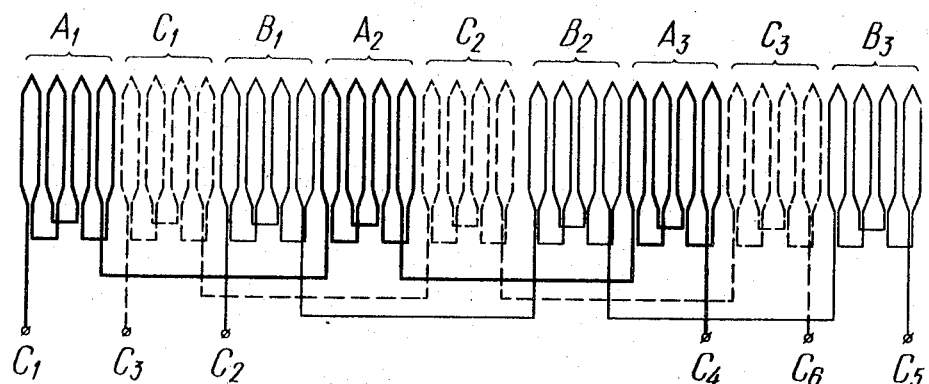
FIG. 4 is a schematic representation of the stator winding of the inductor machine.

The diagram of connections of the coils 2 of the armature winding of the stator 1 for the example under consideration is shown in FIG. 4, where $C_1$ and $C_4$ are the beginning and the end of the phase A; $C_2$ and $C_5$ are the beginning and the end of the phase B; and $C_3$ and $C_6$ are the beginning and the end of the phase C.

In the course of operation of the inductor machine, an electroactive force is induced in each of the coils 2, the electromotive forces of the adjacent coils 2 being displaced relative to each other by an electric angle $\alpha$ which is equal to:

$$\pi = (2\pi \cdot z_r)/z_s = (2\pi \cdot 15)/36 = 5\pi/6 \text{ electrical degrees.}$$

The angle $\gamma$ between two adjacent branches belonging to different phases, which is determined by four tooth intervals of the stator, in our case is equal to 240 electrical degrees, because $$\gamma = 4\alpha = 4 \cdot (5/6) \pi = 2\pi(2 - \frac{1}{3}) \text{ electrical degrees.}$$

Two branches of one phase are displaced relative to each other by twelve tooth intervals, with no displacement $\alpha'$ between them in electrical degrees (the latter displacement being multiple to $2\pi$ electrical degrees), because $$\alpha' = 12\alpha = 12 (5\pi/6) = 5 \cdot 2\pi \text{ electrical degrees.}$$

As is seen from the foregoing example, the proposed design meets all the requirements imposed upon a symmetrical three-phase stator winding, wherein each phase consists of three branches that are series-connected and symmetrically arranged around the stator bore.

What is claimed is:

1. An inductor machine comprising: a toothed stator; a multiphase armature winding arranged upon the teeth of the stator with a constant tooth pitch close, but not equal, to $\pi$ electrical degrees; a windingless toothed rotor which is enveloped by said stator; a ring field winding producing a common magnetic flux in said stator and said rotor; each phase of said armature winding consisting of at least three series-connected and symmetrically arranged branches with a displacement therebetween in electrical degrees being multiple to $2\pi$; each said branch consisting of coils arranged upon adjacent teeth of the stator, the number of the latter teeth being different from the doubled number of the teeth of the windingless toothed rotor by a value equal to the doubled number of the branches.

* * * * *